United States Patent
Suzuki et al.

(10) Patent No.: US 10,824,546 B2
(45) Date of Patent: Nov. 3, 2020

(54) TEST METHOD AND NON-TRANSITORY COMPUTER READABLE MEDIUM STORING PROGRAM FOR TESTING MODULES

(71) Applicant: TOYOTA JIDOSHA KABUSHIKI KAISHA, Toyota (JP)

(72) Inventors: Shinichi Suzuki, Okazaki (JP); Hideaki Yajima, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 144 days.

(21) Appl. No.: 15/976,931

(22) Filed: May 11, 2018

(65) Prior Publication Data
US 2018/0329810 A1  Nov. 15, 2018

(30) Foreign Application Priority Data
May 15, 2017 (JP) .................................. 2017-096557

(51) Int. Cl.
*G06F 11/00* (2006.01)
*G06F 11/36* (2006.01)

(52) U.S. Cl.
CPC ...... *G06F 11/3688* (2013.01); *G06F 11/3672* (2013.01); *G06F 11/3684* (2013.01); *G06F 11/3692* (2013.01)

(58) Field of Classification Search
CPC ............. G06F 11/3672; G06F 11/3684; G06F 11/3688; G06F 11/3692
See application file for complete search history.

(56) References Cited

U.S. PATENT DOCUMENTS

| | | | | |
|---|---|---|---|---|
| 7,954,091 B2* | 5/2011 | Li | ............................. | G06F 8/24 717/135 |
| 8,627,296 B1* | 1/2014 | Picard | ................. | G06F 11/3684 717/124 |
| 9,009,682 B2* | 4/2015 | Tsantilis | .............. | G06F 11/3688 717/124 |
| 9,146,842 B2* | 9/2015 | Herron | ................. | G06F 11/3684 |
| 9,208,044 B2* | 12/2015 | Shanbhag | ........... | G06F 11/3684 |
| 9,317,405 B2* | 4/2016 | Yoshida | .............. | G06F 11/3684 |
| 9,396,097 B2* | 7/2016 | Lopian | ................ | G06F 11/3684 |
| 9,626,276 B2* | 4/2017 | Schwarzmann | .... | G06F 11/3612 |
| 9,697,109 B2* | 7/2017 | Kucharski | ........... | G06F 11/3612 |
| 9,779,014 B2* | 10/2017 | Baldwin | .............. | G06F 11/3696 |
| 9,870,311 B2* | 1/2018 | Clark | .................. | G06F 11/3684 |
| 10,394,699 B1* | 8/2019 | Kinderman | ......... | G06F 11/3676 |

(Continued)

FOREIGN PATENT DOCUMENTS

JP  2009-129133 A  6/2009

*Primary Examiner* — Elmira Mehrmanesh
(74) *Attorney, Agent, or Firm* — Hunton Andrews Kurth LLP (57) ABSTRACT

A test method for a first module that is performed by an information processing device includes integrating a second module or a test module that performs the same response as the second module to the first module, performing an integration test on a module group including at least the first module, and outputting any one of a result of an integration test for the first module and the second module and a result of an integration test for the first module based on determination data indicating which one of the second module and the test module is integrated to the first module.

16 Claims, 9 Drawing Sheets

(56) References Cited

U.S. PATENT DOCUMENTS

| | | | | |
|---|---|---|---|---|
| 2011/0239194 A1* | 9/2011 | Braude | ............... | G06F 11/3688 |
| | | | | 717/124 |
| 2012/0084754 A1* | 4/2012 | Ziegler | ............... | G06F 11/3696 |
| | | | | 717/124 |
| 2013/0145351 A1* | 6/2013 | Tunik | ...................... | G06F 9/451 |
| | | | | 717/135 |
| 2014/0068334 A1* | 3/2014 | Horsman | ............ | G06F 11/3684 |
| | | | | 714/32 |
| 2015/0378880 A1* | 12/2015 | Kucharski | ........... | G06F 11/3612 |
| | | | | 717/130 |
| 2016/0147642 A1* | 5/2016 | Haeuptle | ............. | G06F 11/3672 |
| | | | | 717/124 |
| 2017/0052887 A1* | 2/2017 | Monpratarnchai | .......................... | |
| | | | | G06F 11/3688 |

\* cited by examiner

| TEST NAME | TEST TARGET | | | MOCK SETTING | | |
|---|---|---|---|---|---|---|
| | API NAME | ARGUMENT | RETURN VALUE | API NAME | ARGUMENT | RETURN VALUE |
| TEST A1 | API a1 | 1, 1 | TRUE | API b1 | 1 | TRUE |
| | | | | API x1 | 1 | TRUE |
| TEST A2 | API a1 | -1, -1 | FALSE | NONE | NONE | NONE |
| TEST A3 | API a2 | 0, 0 | FALSE | API b1 | 1 | FALSE |
| | | | | API b2 | 2 | FALSE |
| TEST A4 | API a2 | 0, 0 | TRUE | API b1 | 1 | FALSE |
| | | | | API b2 | 2 | TRUE |
| ⋮ | ⋮ | ⋮ | ⋮ | ⋮ | ⋮ | ⋮ |

| TEST NAME | TEST TARGET | | | MOCK SETTING | | |
|---|---|---|---|---|---|---|
| | API NAME | ARGUMENT | RETURN VALUE | API NAME | ARGUMENT | RETURN VALUE |
| TEST B1 | API b1 | 1 | TRUE | API y1 | 1 | TRUE |
| TEST B2 | API b1 | 1 | FALSE | NONE | NONE | NONE |
| TEST B3 | API b1 | 2 | FALSE | API y1 | 2 | FALSE |
| TEST B4 | API b2 | 2 | FALSE | API y2 | NONE | TRUE |
| ⋮ | ⋮ | ⋮ | ⋮ | ⋮ | ⋮ | ⋮ |

| TEST NAME BEFORE CONVERSION | TEST NAME AFTER CONVERSION |
|---|---|
| TEST A1 | TEST B1 |
| TEST A2 | (NONE) |
| TEST A3 | TEST B2 |
| | TEST B4 |
| TEST A4 | NO TEST IS PERFORMED |
| ⋮ | ⋮ |

TEST METHOD AND NON-TRANSITORY COMPUTER READABLE MEDIUM STORING PROGRAM FOR TESTING MODULES

INCORPORATION BY REFERENCE

The disclosure of Japanese Patent Application No. 2017-096557 filed on May 15, 2017 including the specification, drawings and abstract is incorporated herein by reference in its entirety.

BACKGROUND

1. Technical Field

The present disclosure relates to a test method and a non-transitory computer readable medium storing a program.

2. Description of Related Art

In the related art, a unit test for testing a coded program in units of modules and an integration test for integrating and testing a plurality of modules are known in software development.

In a test, a technology using a stub, which behaves as a module to be used for the test has been known. Specifically, first, a test driver constitutes a test target module by integrating a dependent module to a stub. When a call from the test target module to the dependent module is detected, module execution means determines whether to execute the dependent module or execute the stub based on predetermined conditions. A technology capable of partially changing or supplementing a behavior of a module to be used for a test using a stub by doing as described above has been known (for example, Japanese Unexamined Patent Application Publication No. 2009-129133 (JP 2009-129133 A)).

SUMMARY

However, in the related art, it is needed to separately prepare a test case for executing the unit test and a test case for executing the integration test. That is, there is a problem in that a test case for a unit test cannot be diverted to an integration test.

Therefore, the present disclosure provides a test method for diverting a test case for a unit test to a test case for an integration test, and a non-transitory computer readable medium storing a program.

A first aspect of the present disclosure relates to a test method for a first module that is performed by an information processing device. The test method includes integrating a second module or a test module that performs the same response as the second module to the first module, performing an integration test on a module group including at least the first module, and outputting any one of a result of an integration test for the first module and the second module and a result of an integration test for the first module based on determination data indicating which one of the second module and the test module is integrated to the first module.

In the test method according to the first aspect of the present disclosure, the outputting of the result of the test may include outputting the result of the integration test for the first module and the second module when the determination data indicates that the second module is integrated to the first module, and outputting the result of the integration test for the first module when the determination data indicates that the test module is integrated to the first module.

In the test method according to the first aspect of the present disclosure, in the integration test, the integration test for the first module and the second module may be performed as the integration test when the determination data indicates that the second module is integrated to the first module, and the integration test for the first module may be performed as the integration test when the determination data indicates that the test module is integrated to the first module.

In the test method according to the first aspect of the present disclosure, the first module and the second module may be files described in a programming language or a hardware description language.

In the test method according to the first aspect of the present disclosure, the determination data may be link information indicating a link destination of the first module.

In the test method according to the first aspect of the present disclosure, the determination data may be flag information indicating a type of a module to which the first module is linked.

In the test method according to the first aspect of the present disclosure, when a determination is made that the test module has been integrated to the first module based on the determination data, the integration test for the second module may not be performed in the integration test.

The test method according to the first aspect of the present disclosure may further include performing a unit test on the first module. The unit test and the integration test may use the same interface and parameters.

In the test method according to the first aspect of the present disclosure, the test module may be a stub.

A second aspect of the present disclosure relates to a non-transitory computer readable medium storing a program for causing a computer to execute a test method for a first module. The program causes the computer to execute: an integrating procedure of integrating a second module or a test module that performs the same response as the second module to the first module; an integration test procedure of performing an integration test on a module group including at least the first module; and a test result output procedure of outputting any one of a result of an integration test for the first module and the second module and a result of an integration test for the first module based on determination data indicating which one of the second module and the test module is integrated to the first module.

With the above configuration, the information processing device can integrate the second module or the test module to the first module using the integrating procedure.

The information processing device can determine whether the second module is integrated to the first module or the test module is integrated to the first module according to the determination data.

When the second module is integrated to the first module, the information processing device performs the integration test for the first module and the second module. On the other hand, when the test module is integrated to the first module, the information processing device performs the integration test for the first module and omits the test for the second module. As described above, switching between the integration tests occurs according to the module to be integrated. Thus, the information processing device can perform the test efficiently, and the test case for the unit test can be diverted to the test case for the integration test.

In addition to the file described in the programming language, the information processing device can set a file or the like described in the hardware description language as a test target.

Further, the information processing device can reduce performance of useless tests by causing the integration test for the second module not to be performed in the integration test procedure when a determination is made that the test module has been integrated.

When the same interface and parameters are used for the unit test and the integration test, the information processing device can divert the test case for the unit test to the test case for the integration test.

The information processing device may perform a test with the test module as a stub.

The test case for the unit test can be diverted to the test case for the integration test.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, embodiments of the present disclosure will be described with reference to the accompanying drawings.

Example of Hardware Configuration of Information Processing Device

For example, a test is performed on the information processing device as follows.

Figure 1:
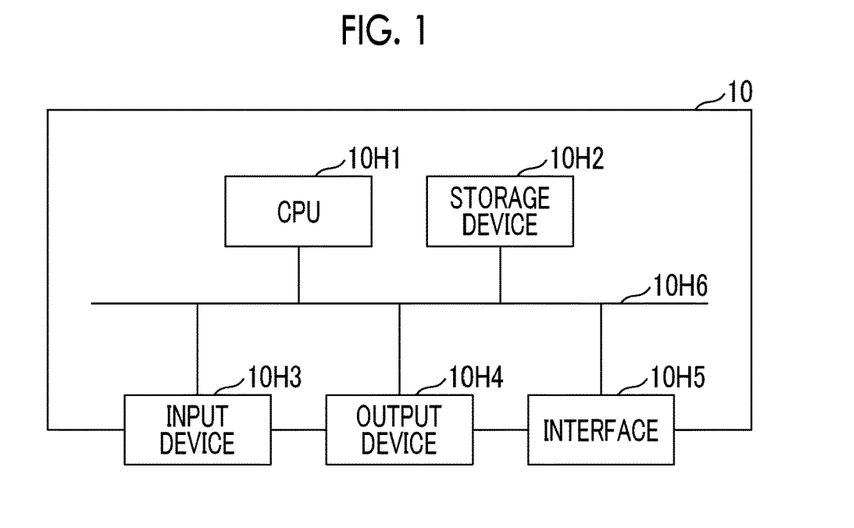
FIG. 1 is a block diagram illustrating an example of a hardware configuration of an information processing device according to an embodiment of the present disclosure.

FIG. 1 is a block diagram illustrating an example of a hardware configuration of the information processing device according to an embodiment of the present disclosure. For example, the information processing device is a personal computer (PC) 10. As illustrated in FIG. 1, the PC 10 is a hardware configuration including a central processing unit (CPU) 10H1, a storage device 10H2, an input device 10H3, an output device 10H4, and an interface 10H5.

The CPU 10H1 is an arithmetic device and a control device. The storage device 10H2 is a main storage device such as a memory. Further, the storage device 10H2 may further include an auxiliary storage device. The input device 10H3 is a keyboard or the like, and receives an operation performed by the user. The output device 10H4 is a display or the like, and outputs processing results and the like to the user. The interface 10H5 is a connector or the like, and transmits or receives data to or from an external device via a network, a cable, or the like. The above-described hardware resources are connected by a bus 10H6, and transmit or receive data to or from each other.

The information processing device that executes the test is not limited to the hardware configuration as illustrated in FIG. 1. For example, the information processing device may have a hardware configuration in which an arithmetic device, a control device, or a storage device is included inside or outside the illustrated hardware configuration. Further, the information processing device may be, for example, a server.

Example of Configuration of Unit Test

Hereinafter, a case where a plurality of modules programmed on the PC 10 or a device other than the PC 10 illustrated in FIG. 1 is subjected to a unit test and an integration test will be described by way of example. First, an example of a first module that is a test target is assumed to be "program A", and an example of a second module is assumed to be "program B". Therefore, program A and program B are targets of the unit test.

Program A and program B are assumed to be modules to be integrated and used. Therefore, the integration test is performed by integrating program A and program B.

That is, hereinafter, an example in which a unit test of program A, a unit test of program B, and an integration test in which program A and program B are integrated to each other are performed will be described.

Example of Configuration of Unit Test of First Module

First, a unit test of program A is performed with the following configuration, for example.

Figure 2:
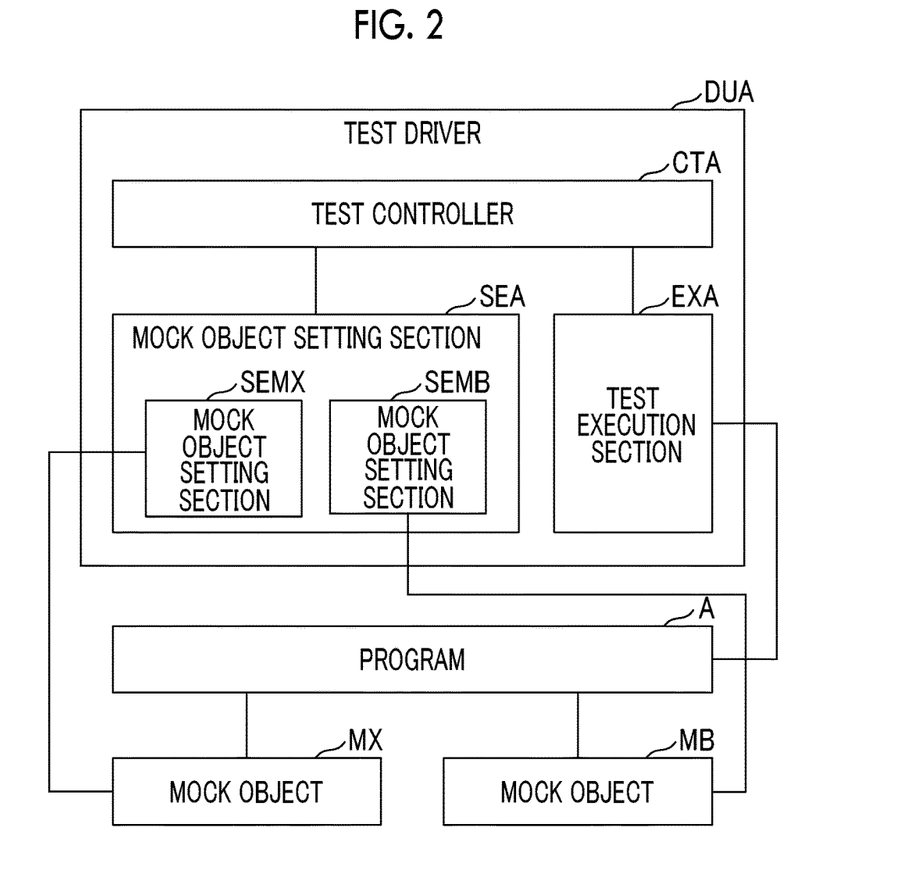
FIG. 2 is a block diagram illustrating an example of a configuration for performing a unit test on a first module according to the embodiment of the present disclosure.

FIG. 2 is a block diagram illustrating an example of a configuration for performing a unit test of a first module according to the embodiment of the present disclosure. As illustrated in FIG. 2, program A is input to the PC 10, and a program for performing a unit test of program A is hereinafter referred to as a "test driver DUA".

Program A is assumed to have a specification in which program B and program X are called by an application programming interface (API) during execution of program A. Therefore, when program B and program X are integrated to program A or modules (hereinafter referred to as "test modules") such as respective stubs or mock objects substituted for program B and program X are not integrated to program A, program A is assumed as a module in which the test and the process cannot be executed.

The test module is a module that is integrated instead of a module to be originally integrated, for example, when a module to be integrated is still under development. Specifically, when the test module is called in a test, the test module has a reaction needed for a test, such as returning the same return value as that of the module. According to a specification of the module, there is a module that waits for the return value from another module and performs the next process. Therefore, in a case where a specification is the specification as described above, when a module returning any return value is not integrated, the module may continue to wait for the return value and the process may not proceed. Since there is the case as described above, the module cannot be tested when there is no test module returning the return value, for convenience.

In addition, in compiling for executing a program, a compiler is often regarded as having a compile error when a module to be called by a program to be executed is not integrated. That is, when the compiler is regarded as having the compile error, the test or the like is stopped. Therefore, when a test module is integrated instead of a module under development, the compiler can be prevented from being regarded as having a compile error. Therefore, the test module is integrated to the program to be executed at the time of the test.

In the illustrated example, a configuration in which a "mock object MB" which is a test module of program B and a "mock object MX" which is a test module of program X are integrated to each other in place of program B and program X, and the unit test of program A is performed is shown.

Therefore, the test driver DUA has, for example, a functional configuration in which a test controller CTA, a mock object setting section SEA, and a test execution section EXA are included, as illustrated. The mock object setting section SEA has a functional configuration in which a mock object setting section SEMX for the mock object MX and a mock object setting section SEMB for the mock object MB are included.

For example, the test controller CTA stores a test case in a list format and requests the mock object setting section SEA and the test execution section EXA to perform a process in order to perform a test that is designated by the test case. For example, a test case for program A is generated as follows.

Figure 3:
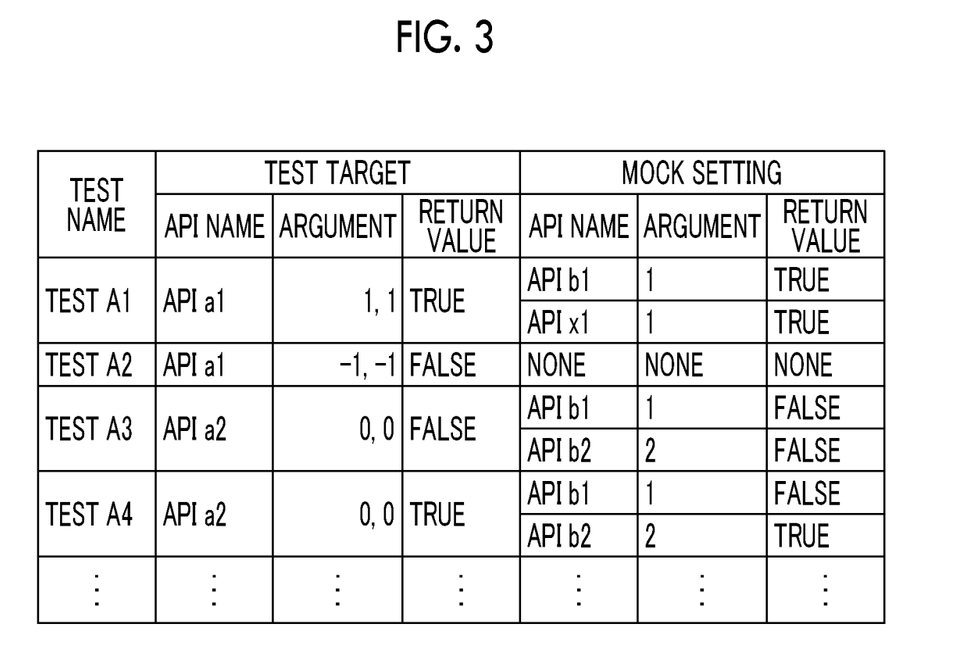
FIG. 3 is a diagram illustrating an example of a test case for program A according to the embodiment of the present disclosure.

FIG. 3 is a diagram illustrating an example of a test case for program A according to the embodiment of the present disclosure.

In the test case illustrated in FIG. 3, a name or the like capable of specifying each test is input as "test name". Therefore, in the above example, one row of "test name" indicates content of one test.

In the test case illustrated in FIG. 3, "test target" indicates an interface and a parameter to test, in a module to be tested (which is program A in the example illustrated in FIG. 2). Specifically, "API name" in the "test target" indicates, for example, a name of an API with which an API that is a test target can be specified among APIs of program A. An "argument" in the "test target" is an example of a parameter that is set in the API determined by the "API name". Therefore, a value determined based on a specification of each API is input as "argument".

A "return value" in the "test target" is a value that is returned from another module or the like as a result of execution of the test. That is, the "return value" is a so-called expected value. In other words, as a result of the test, when a value as set in the "return value" of the "test target" is returned from the other module or the like, a determination is made that a function of the module that is a test target has been generated according to the specification, that is, created normally without a bug.

In each test, "mock object setting" indicates a setting of a mock object related to the test. Specifically, in the example illustrated in FIG. 2, the mock object MX, the mock object MB, or both of the mock objects are mock objects related to the test of program A according to the test. Therefore, in the example illustrated in FIG. 2, a setting for the APIs included in the mock object MX or the mock object MB is input to the "mock object setting". Specifically, "API name" in the "mock object setting" indicates, for example, a name with which an API included in the mock object MX or the mock object MB that is called in the test can be specified. Further, the "argument" in the "mock object setting" indicates a value that is set in the API at the time of the test. Further, the "return value" in the "mock object setting" indicates an expected value that is returned from the mock object when the API of each mock object is called.

The test case is not limited to an illustrated format and items. The format and value of the argument and the return value are determined according to, for example, the specification.

For example, when the unit test is performed based on the test case illustrated in FIG. 3, the test controller CTA notifies the mock object setting section SEA and the test execution section EXA of the API to be executed and parameters based on the test case in the configuration illustrated in FIG. 2. Specifically, in the "test A1", the test controller CTA notifies the test execution section EXA of the API name "API a1" and the argument "(1, 1)".

Further, the test controller CTA notifies the mock object setting section SEMX of the "API name" and the "argument" in the "mock object setting" serving as a setting of the mock object MX. Specifically, the test controller CTA notifies the mock object setting section SEMX of, for example, "API x1" and "1" in the "test A1". The mock object setting section SEMX sets the notified argument or the like in the mock object MX.

Similarly, the test controller CTA notifies the mock object setting section SEMB of the "API name" and the "argument" in the "mock object setting" serving as a setting for the mock object MB. Specifically, the test controller CTA notifies the mock object setting section SEMB of, for example, "API b1" and "1" in "test A1". The mock object setting section SEMB sets the notified argument and the like in the mock object MB.

The test controller CTA notifies the test execution section EXA of the API name, the arguments, and the return value that are a test target in the test of program A. The test execution section EXA calls the notified API. Notified arguments are set in the API call. The test execution section EXA waits for the return value to be returned from the module. Subsequently, the test execution section EXA compares the return value returned as a processing result by each module in the test with the notified return value, that is, the expected value. When the return values match each other as a result of the comparison, the test execution section EXA stores test success, that is, the fact that the module that is a test target operates according to the specification. On the other hand, when the return values do not match each other as a result of the comparison, the test execution section EXA stores a test failure, that is, the fact that there is a bug in the module that is a test target.

Example of Configuration of Unit Test of Second Module

The program B is subjected to, for example, the unit test with the following configuration.

Figure 4:
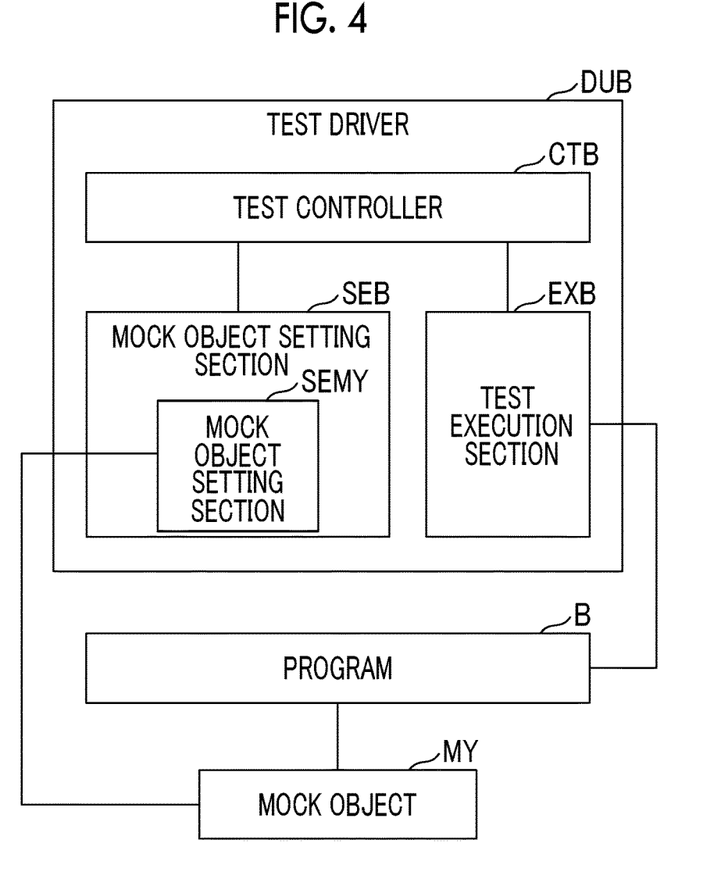
FIG. 4 is a block diagram illustrating an example of a configuration for performing a unit test on a second module according to the embodiment of the present disclosure.

FIG. 4 is a block diagram illustrating an example of a configuration for performing the unit test of the second module according to the embodiment of the present disclosure. As illustrated in FIG. 4, program B is input to the PC 10, and a program for performing a unit test of program B is hereinafter referred to as a "test driver DUB".

For example, the test driver DUB has a functional configuration in which a test controller CTB, a mock object setting section SEB, and a test execution section EXB are included, similar to the test driver DUA illustrated in FIG. 2. The mock object setting section SEB has a functional configuration in which a mock object setting section SEMY for a mock object MY is included.

As illustrated in FIG. 4, it is assumed that program B that is a test target is a specification to be integrated to program Y and executed. Therefore, it is assumed that the mock object MY which is a test module of program Y is used in the unit test of program B.

A test case for program B is generated as follows, for example.

Figure 5:
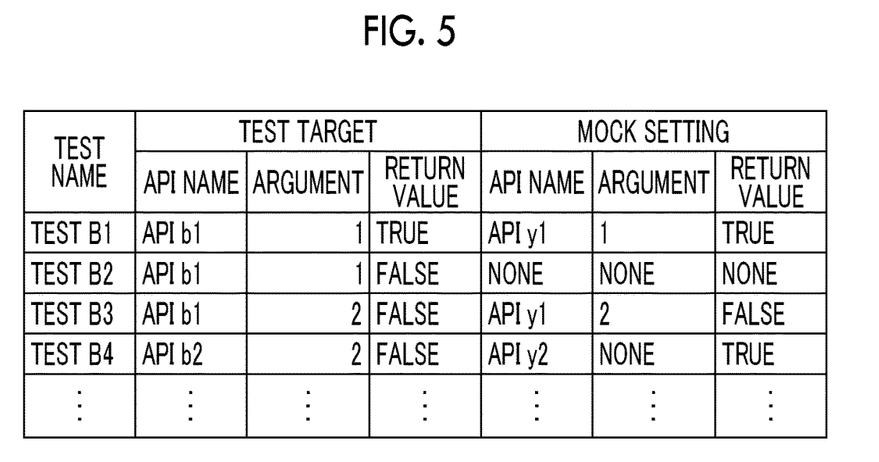
FIG. 5 is a diagram illustrating an example of a test case for program B according to the embodiment of the present disclosure.

FIG. 5 is a diagram illustrating an example of the test case for program B according to the embodiment of the present disclosure. FIG. 5 illustrates the example of the test case for program B in a format that is the same as in FIG. 3.

Program B is a program in which the mock object MY is integrated and tested, as illustrated in FIG. 4. Therefore, as illustrated in FIG. 5, settings of APIs such as "API y1" and "API y2" included in the mock object MY are input to the "mock object setting".

Example of Configuration of Integration Test

Figure 6:
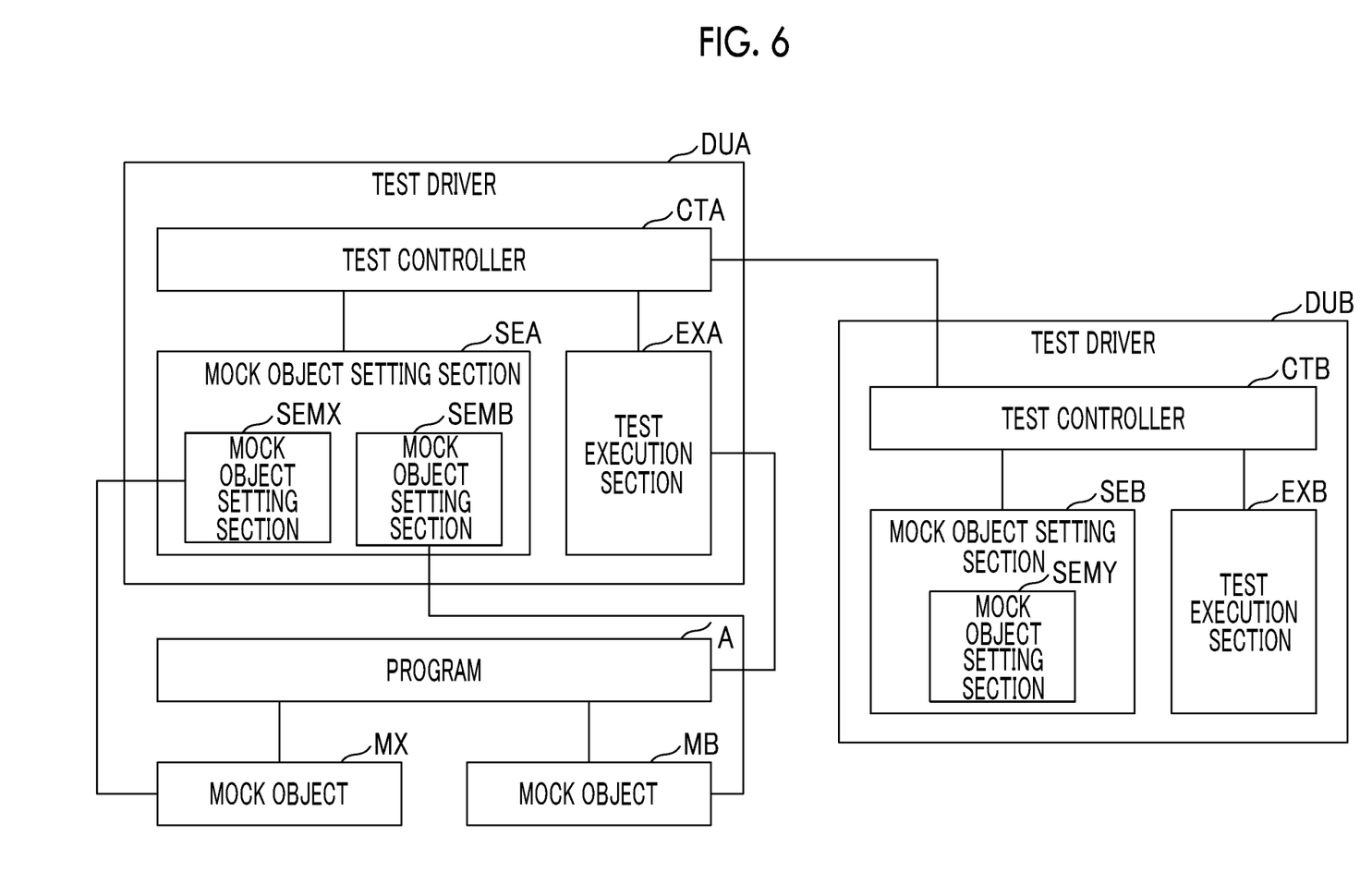
FIG. 6 is a block diagram illustrating an example of a configuration for performing an integration test using a mock object according to the embodiment of the present disclosure.
Figure 7:
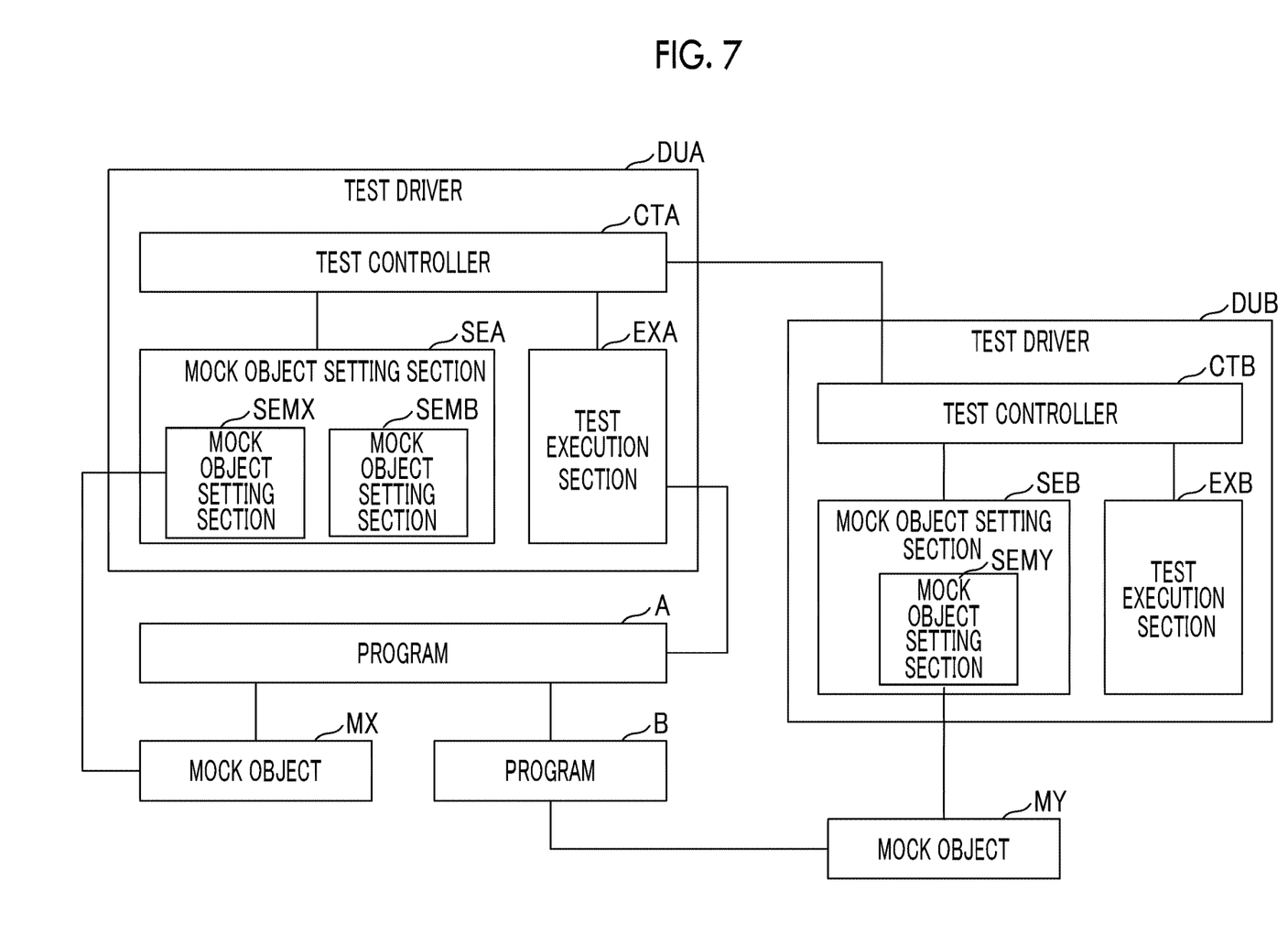
FIG. 7 is a block diagram illustrating an example of a configuration for performing an integration test using program B according to the embodiment of the present disclosure.

The integration test of program A is performed, for example, with a configuration in which the mock object MB is integrated or a configuration in which program B is integrated, as described below.

FIG. 6 is a block diagram illustrating an example of a configuration for performing an integration test using the mock object according to the embodiment of the present disclosure.

FIG. 7 is a block diagram illustrating an example of a configuration for performing an integration test using program B according to the embodiment of the present disclosure.

When the example of the configuration illustrated in FIG. 6 is compared with the example of the configuration illustrated in FIG. 7, a module integrated to a lower-level module of program A is the mock object MB in the example of the configuration illustrated in FIG. 6, whereas the module integrated to the lower-level module of program A is program B in the example of a configuration illustrated in FIG. 7.

Respective configurations of the test driver DUA and the test driver DUB illustrated in FIGS. 6 and 7 are assumed to be the same as the examples of the configurations for a unit test illustrated in FIGS. 2 and 4.

For example, according to a development situation of each module, the test module is replaced with a module which has been developed. Specifically, in a waterfall type development model, when a unit test of each module is completed, an integration test is often performed. In the illustrated example, the unit test of program A is first performed with the configuration illustrated in FIG. 2. When the unit test of program A is completed, the integration test of program A is performed as illustrated in FIG. 6. In the above-described case, program B is still under development, and is often performed in a state in which the unit test is being performed by, for example, the configuration as illustrated in FIG. 4.

That is, according to a development situation of program B, the integration test of program A is switched from the configuration using the test module as illustrated in FIG. 6 to the configuration using the module as illustrated in FIG. 7.

As illustrated in FIG. 6, in the integration test using the mock object MB, the mock object setting section SEMB sets the mock object MB. On the other hand, as illustrated in FIG. 7, in the integration test using program B, the mock object setting section SEMB does not set the mock object MB.

Further, in the integration test using the mock object MB as illustrated in FIG. 6, the test for program B is omitted. On the other hand, in the integration test using program B as illustrated in FIG. 7, the test for program B is performed.

Therefore, a test case for each unit test is converted for the integration test, for example, as follows.

Figure 8:
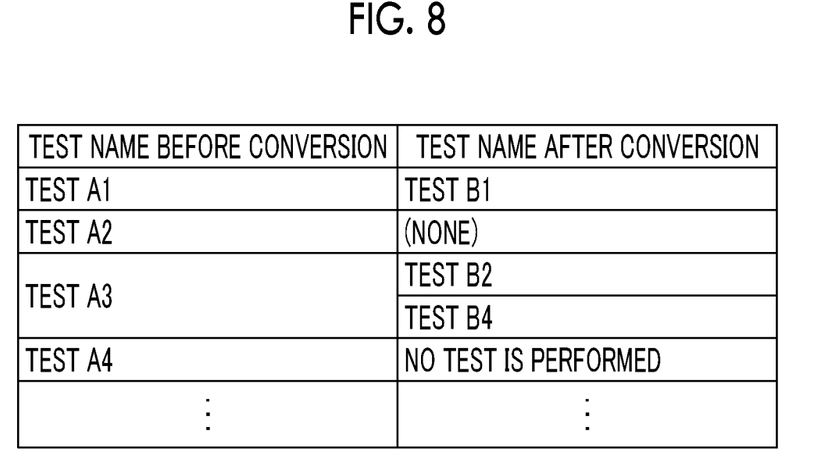
FIG. 8 is a diagram illustrating an example of a conversion table for generating a test case for an integration test according to the embodiment of the present disclosure.

FIG. 8 is a diagram illustrating an example of a conversion table for generating a test case for an integration test according to the embodiment of the present disclosure. FIG. 8 illustrates an example of a test case for program A, that is, a conversion table for converting the test case illustrated in FIG. 3 to a test case for the integration test.

The test case for the integration test is generated by integrating the respective test cases for each unit test. Specifically, a test case that is performed in the configuration illustrated in FIG. 6 or FIG. 7 is generated based on the test case illustrated in FIG. 3 and the test case illustrated in FIG. 5. The conversion based on the illustrated conversion table is a process of changing a test to be performed according to whether a configuration is the configuration using the test module as illustrated in FIG. 6 or the configuration using the module as illustrated in FIG. 7.

In the illustrated example of the conversion, "test A1" is converted to "test B1". In the test case for the unit test illustrated in FIG. 3, the mock object MB is used, and therefore, in the "test A1", a setting of the mock object MB is performed like "API b1" in the "mock object setting". Since the setting as described above is not suitable for the configuration using program B as illustrated in FIG. 7, the test is converted into "test B1" illustrated in FIG. 5 by the conversion table. "Test B1" in FIG. 5 is a test in which a setting of mock object MY or the like is included in order to test program B, as illustrated in FIG. 5. As described above, through the conversion, the test is converted from the test using the mock object MB to the test performed by the test driver DUB. Specifically, in the conversion of "test A1", first, "test A1" illustrated in FIG. 3 is referred to. In "test A1" illustrated in FIG. 3, the "mock object setting" is input. In the above-described example, since settings for "API b1"

and "API x1" are input to the "mock object setting" illustrated in FIG. 3, a determination is made that "API b1" is a conversion target.

In order to convert "API b1", "test B1" in which the same "API name", "argument", and "return value" are set in the "test target" is searched for in the test case illustrated in FIG. 5. Thus, the converted test is specified.

There may be no corresponding test in the test case for the unit test. In the case as described above, a new test may be added to the test case for the integration test. For example, the setting of "API b2" in "test A4" is a test that is not included in the test case illustrated in FIG. 5.

Meanwhile, according to a specification, for an erroneous operation, that is, a so-called abnormal system test, it may be difficult to arrange conditions or the like in the integration test. In the case as described above, for example, as in the "test A4" illustrated in FIG. 8, "No test is performed" is set. Even when a test is performed as the unit test, conversion may be performed so that the test is not performed in the integration test.

When the test module is continuously used in the integration test like the mock object MX, the test for the mock object MX may not be a conversion target. For example, in the test case in FIG. 3, the test is a test in which the "API name" of the "mock object setting" is "API x1".

The conversion table is prepared, for example, in the preparation of an integration test or the like.

Example of Overall Process

Figure 9:
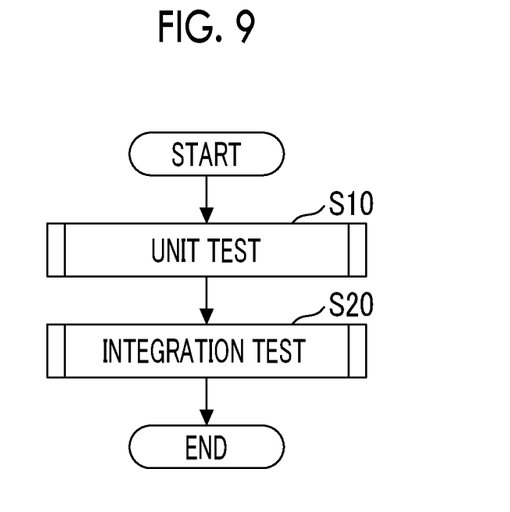
FIG. 9 is a flowchart illustrating an example of an overall process of a test method according to the embodiment of the present disclosure.

FIG. 9 is a flowchart illustrating an example of an overall process of the test method according to the embodiment of the present disclosure.

In step S10, the information processing device performs the unit test. For example, the unit test is performed as follows.

Figure 10:
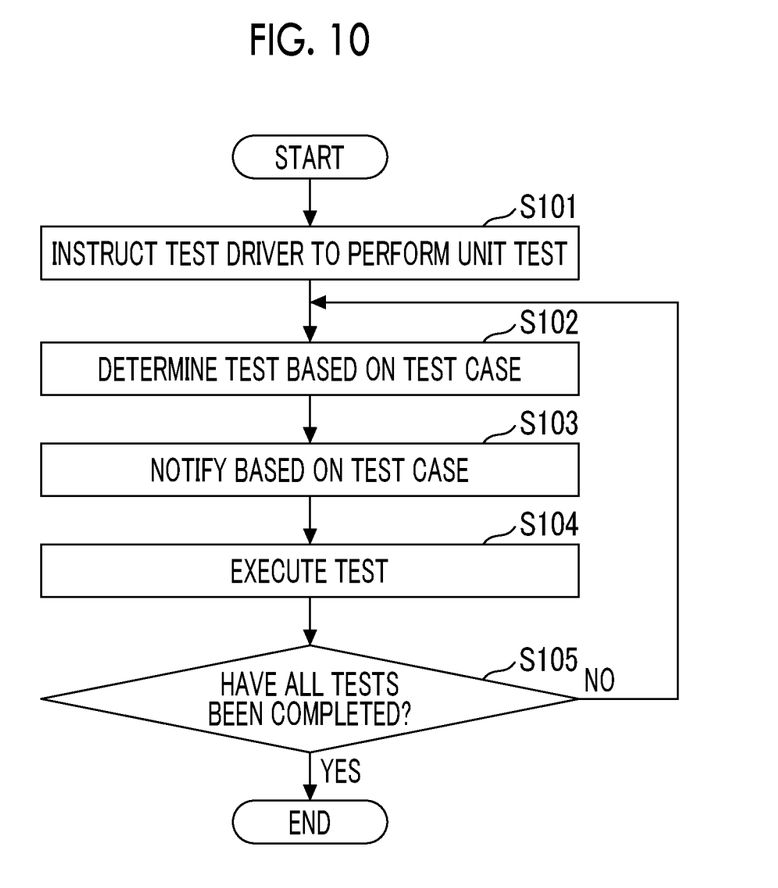
FIG. 10 is a flowchart illustrating an example of a process of a unit test in the test method according to the embodiment of the present disclosure.

FIG. 10 is a flowchart illustrating an example of a process of the unit test in the test method according to the embodiment of the present disclosure.

In step S101, the information processing device instructs the test driver to perform the unit test. Specifically, when the unit test of program A is performed, the test driver DUA illustrated in FIG. 2 is activated based on an operation of the user or the like. Similarly, when the unit test of program B is performed, the test driver DUB illustrated in FIG. 4 is activated based on the operation of the user or the like. When the test driver is activated, the test driver activates the test controller, and refers to arguments or the like to recognize that the type of test to be performed from that point in time is the unit test.

In step S102, the information processing device determines a test to be executed, based on the test case. Specifically, when the case is the test case as illustrated in FIG. 3, the information processing device performs the tests in order from "test A1" which is a first test. The order of the tests is not limited to the order described in the test case. For example, the information processing device may determine to perform the respective tests described in the test case in a random order.

In step S103, the information processing device notifies each configuration of the setting of the unit test based on the test case. Hereinafter, an example in which a unit test of program A using the configuration illustrated in FIG. 2, which is a test using the test case illustrated in FIG. 3 is performed will be described.

In the above-described example, the test controller CTA notifies the mock object setting section SEA and the test execution section EXA of the setting for realizing the test having the test name determined in step S102. That is, the test controller CTA notifies the mock object setting section SEA of, for example, the content of the "mock object setting" illustrated in FIG. 3. On the other hand, the test execution section EXA is notified of, for example, content of the "test target" illustrated in FIG. 3. As described above, when the notification is performed, the information processing device can perform preparation to execute the unit test.

In step S104, the information processing device executes a test. For example, in the configuration illustrated in FIG. 2, the unit test of program A is executed by test execution section EXA. The test is realized, for example, by comparing the "return value" of "test target" in the test case, that is, the expected value with the return value returned from program A. Specifically, the information processing device outputs an error log when the expected value differs from the return value returned from program A as a result of the comparison. As described above, a result of checking whether there is a bug in program A is generated through the test.

In step S105, the information processing device determines whether or not all the tests have been completed. For example, in the test case illustrated in FIG. 3, when the respective tests such as "test A1" to "test A4" are all executed in step S104, the information processing device determines that all the tests have been completed. In a case where the unit test of program B is also continuously performed, when the tests are executed up to the tests such as test B1" to "test B4" illustrated in FIG. 5, the information processing device determines that all the tests have been completed.

When the information processing device determines that all the tests have been completed (YES in step S105), the information processing device ends step S10. On the other hand, when the information processing device determines that all the tests have not been completed (NO in step S105), the information processing device proceeds to step S102.

The unit test procedure is not limited to the illustrated procedure, and may be realized by other procedures.

Referring back to FIG. 9, in step S20, the information processing device performs the integration test. For example, the integration test is performed as follows.

Figure 11:
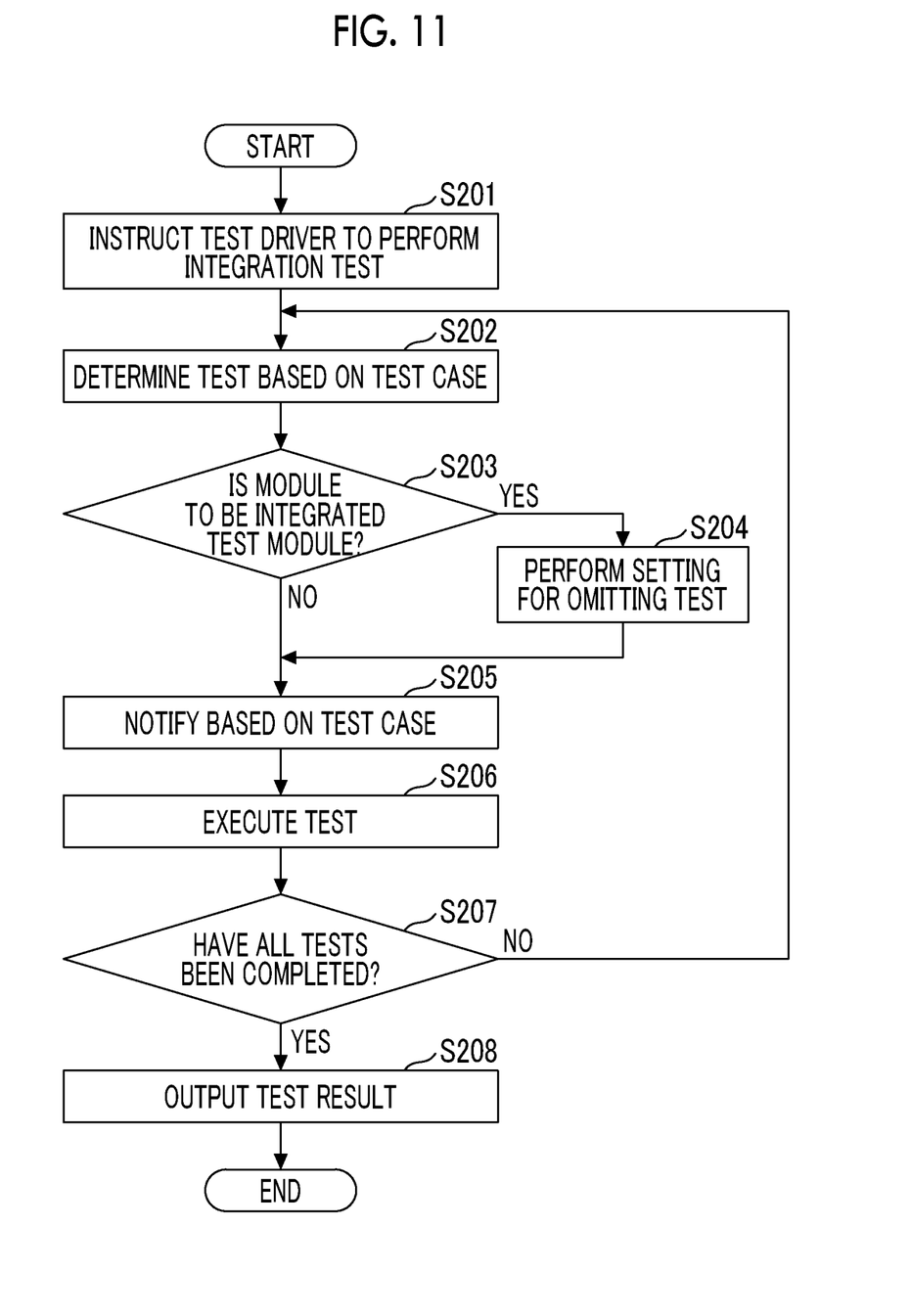
FIG. 11 is a flowchart illustrating an example of a process of an integration test in the test method according to the embodiment of the present disclosure.

FIG. 11 is a flowchart illustrating an example of a process of an integration test in the test method according to the embodiment of the present disclosure.

In step S201, the information processing device instructs the test driver to perform an integration test. Specifically, when the integration test is performed, the test driver for the highest-level module among the modules that are integration test targets is first activated based on the operation of the user or the like. Specifically, in the configurations illustrated in FIGS. 6 and 7, the test driver DUA becomes the highest test driver and is activated. When the test driver DUA is activated, the test driver DUA activates the test controller and refers to arguments or the like to recognize that a type of test to be performed from that point in time is the integration test.

In step S202, the information processing device determines a test to be executed based on the test case. In the integration test, it is desirable for the test case to be converted for an integration test by the conversion table illustrated in FIG. 8.

In step S203, the information processing device determines whether or not the module to be integrated is a test module. Specifically, when the test driver DUA performs an integration test, the information processing device determines whether the mock object MB is integrated to program A as illustrated in FIG. 6 or program B is integrated to program A as illustrated in FIG. 7. When a determination is made that the mock object MB has been integrated to program A, the information processing device determines that the module to be integrated is the test module.

Whether or not the module to be integrated is the test module is determined based on the determination data. The determination data is, for example, a code or the like (hereinafter referred to as "link information") indicating a link destination included in program A. That is, program A determines whether the link destination is set to the mock object MB or program B according to the link information. Therefore, when the link information is a code indicating program B, the information processing device determines that the module to be integrated is not the test module. On the other hand, when the link information is a code indicating the mock object MB, the information processing device determines that the module to be integrated is the test module.

The information processing device is not limited to the link information, and may perform the determination based on determination data such as data indicating whether or not a module to be integrated in advance is the test module. That is, the determination data is, for example, flag information. Specifically, when the module is the test module such as the mock object MB, "ON" is set in the flag information, whereas when the module is a module such as program B, "OFF" is set in the flag information. Therefore, the information processing device can determine whether or not the module to be integrated is the test module when the information processing device determines whether "ON" is set in the determination data or "OFF" is set in the determination data.

When the information processing device determines that the module to be integrated is the test module (YES in step S203), the information processing device proceeds to step S204. On the other hand, when the information processing device determines that the module to be integrated is not the test module (NO in step S203), the information processing device proceeds to step S205.

In step S204, the information processing device performs a setting for omitting the test. Specifically, when the configuration as illustrated in FIG. 6 is adopted, the information processing device performs a setting such that the test for program B is omitted in step S206 that is a subsequent stage. In the configuration illustrated in FIG. 6, since the module to be integrated to program A is the test module, the test for program B is often not executable or is useless even when the test is executed in many cases. Therefore, in step S204, the information processing device prevents the test for the module determined for the test module to be integrated thereto from being performed in step S206 that is a subsequent stage. For example, in the test case, the information processing device skips the test corresponding to the test module and performs the next test.

Thus, the information processing device can reduce inexecutable or useless tests and shorten the test time.

In step S205, the information processing device notifies each configuration of the settings of the integration test based on the test case. First, an example in which an integration test using the configuration illustrated in FIG. 7 is performed will be described.

In the above-described example, the test controller CTA notifies the mock object setting section SEA and the test execution section EXA of a setting for realizing the test having the test name determined in step S202. When the test for program B is included, the test controller CTA notifies the test controller CTB of the setting. In a configuration in which there is a further lower-level module, notification may be performed to a further lower-level test controller.

Whether or not the notification of the setting from the test controller CTA to the test controller CTB as described above is performed is determined according to the determination in step S203.

As illustrated in FIG. 7, in the configuration in which program B is integrated, setting or the like for the mock object MB is not performed. Therefore, the mock object setting section SEMB is restricted not to perform the setting.

Whether or not the restriction of the setting by the mock object setting section SEMB as described above is performed is determined according to the determination in step S203.

As described above, when a determination is made that the module such as program B has been integrated in the determination in step S203, the information processing device can prevent an error from increasing or a processing time from increasing by restricting the setting for unnecessary mock object MB. On the other hand, when the test module such as a determination is made that the mock object MB has been integrated in the determination in step S203, the information processing device can cause the test driver DUA and the test driver DUB to operate in conjunction with each other for the integration test and set, for example, the mock object MB that is used for the integration test.

On the other hand, in the configuration in which the test module is integrated as illustrated in FIG. 6, the test for program B is omitted in step S204. Therefore, in the information processing device, as illustrated in FIG. 6, the test controller CTB operates such that the test for program B is restricted.

In step S205, the information processing device does not notify the lower-level module of the test case and may notify the lower-level module of content of, for example, the API name, the argument, and the return value serving as the expected value indicated by the test case. On the lower-level module side, the test may be executed in step S206 after content of the subject module in the notified content is searched for.

In step S206, the information processing device executes a test. For example, in step S206, the test is executed similarly to the unit test. That is, the test is realized by, for example, comparing the expected value with the return value returned from program A.

In step S207, the information processing device determines whether or not all the tests have been completed. For example, in the test case illustrated in FIG. 3, when the respective tests such as "test A1" to "test A4" are all executed in step S206, the information processing device determines that all the tests have been completed. In a case where the test of program B is also continuously performed, when the tests are executed up to the tests such as "test B1" to "test B4" illustrated in FIG. 5, the information processing device determines that all the tests have been completed. A determination is made that the tests omitted in step S204 are completed tests.

When the information processing device determines that all the tests have been completed (YES in step S207), the information processing device proceeds to step S208. On the other hand, when the information processing device determines that all the tests have not been completed (NO in step S207), the information processing device proceeds to step S202.

In step S208, the information processing device outputs a test result. Specifically, the information processing device outputs results of the respective tests executed in step S205. Switching between the test results to be output occurs according to the determination based on the determination data. That is, when a determination is made that the mock object MB has been integrated to program A based on the determination data, the information processing device outputs the result of the integration test for program A. On the other hand, when a determination is made that program B has been integrated to program A based on the determination data, the information processing device outputs the results of both the integration tests for program A and program B.

When the overall process as described above is performed, it is possible to divert the test cases for the unit test and perform the same test as the unit test in the integration test.

Example of Functional Configuration

Figure 12:
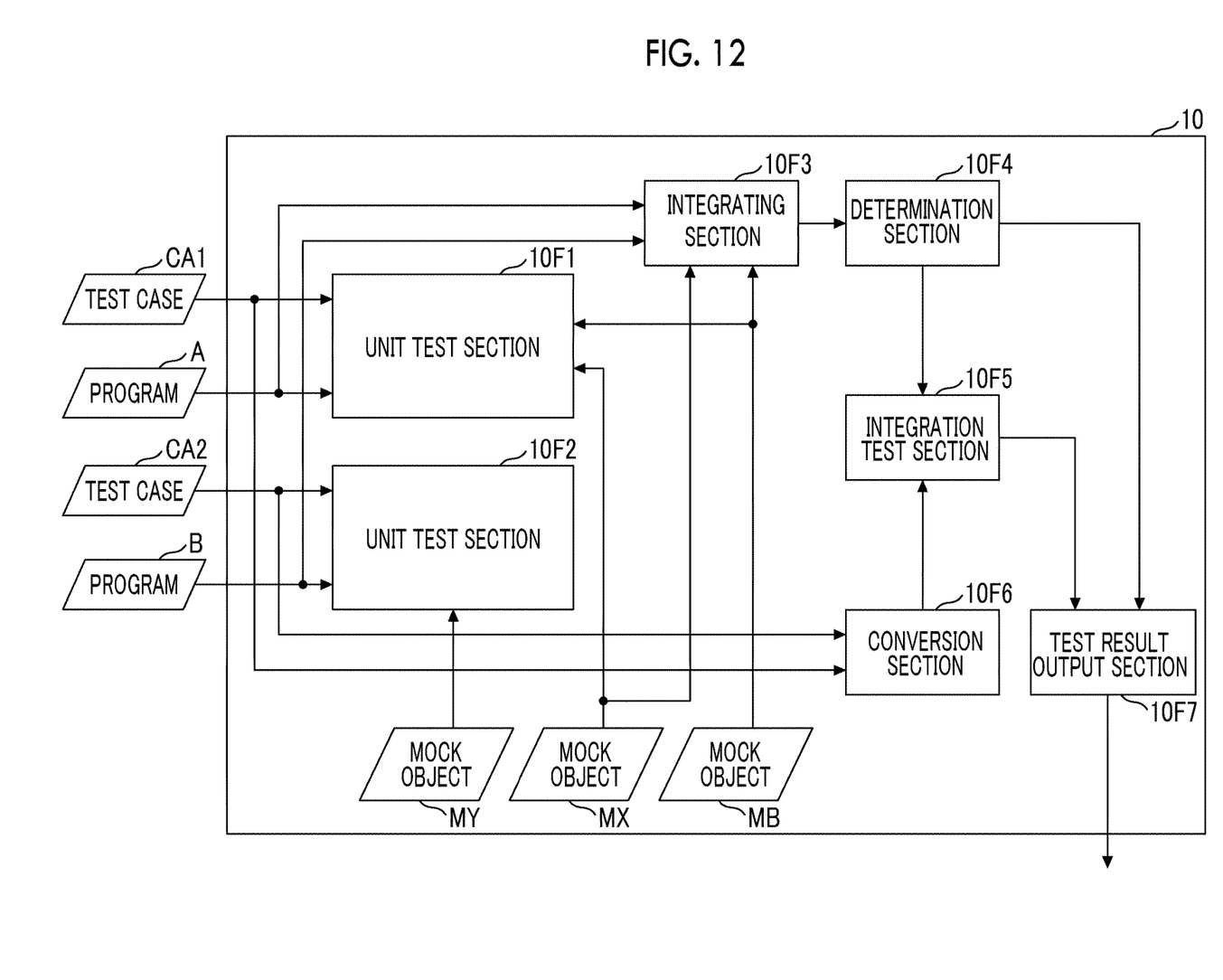
FIG. 12 is a functional block diagram illustrating an example of a functional configuration of an information processing device according to the embodiment of the present disclosure.

FIG. 12 is a functional block diagram illustrating an example of a functional configuration of the information processing device according to the embodiment of the present disclosure. For example, the PC 10 has a functional configuration in which an integrating section 10F3, a determination section 10F4, an integration test section 10F5, and a test result output section 10F7 are included. As illustrated in FIG. 12, it is desirable for the PC 10 to have a functional configuration in which a unit test section 10F1, a unit test section 10F2, and a conversion section 10F6 are further included. Hereinafter, the illustrated functional configuration will be described by way of example.

The unit test section 10F1 and the unit test section 10F2 perform a unit test procedure for executing a unit test for each module. For example, the unit test section 10F1 and the unit test section 10F2 are realized by the CPU 10H1 (see FIG. 1) or the like.

The integrating section 10F3 performs an integrating procedure for integrating program A and program B. Alternatively, the integrating section 10F3 performs an integrating procedure for integrating program A and the mock object MB. For example, the integrating section 10F3 is realized by the CPU 10H1 (see FIG. 1) or the like.

The determination section 10F4 performs a determination procedure for determining which of program B or the mock object MB is integrated to program A based on the determination data. For example, the determination section 10F4 is realized by the CPU 10H1 (see FIG. 1) or the like.

The integration test section 10F5 performs an integration test procedure of performing an integration test of a module group including at least program A. For example, the integration test section 10F5 is realized by the CPU 10H1 (see FIG. 1) or the like.

The test result output section 10F7 performs a test result output procedure for outputting any one of the result of the integration test for program A and the result of the integration test for program A and program B. Switching between the test results output by the test result output section 10F7 occurs based on the determination data, that is, the determination result of the determination section 10F4. For example, the test result output section 10F7 is realized by the CPU 10H1 (see FIG. 1) or the like.

First, the PC 10 can perform the unit test on the first module and the second module such as program A and program B using the unit test sections 10F1, 10F2. For each unit test, test modules such as mock objects MB, MX, MY are used. Using the test modules as described above, the PC 10 can execute the unit test indicated by test cases CA1, CA2 by substituting the test module for a module that is, for example, under development and cannot be used for a unit test.

For example, the unit test is realized by the configuration as illustrated in FIGS. 2 and 4. Further, the unit test is realized by a flow as illustrated in FIG. 10, for example.

The PC 10 integrates program A and program B using the integration section 10F3 and performs the integration test. On the other hand, when the second module such as program B cannot be used for the integration test, the mock object MB is integrated to program A. As described above, the PC 10 integrates program B or, for example, the mock object MB that performs the same response as program B to program A so that the integration test can be executed.

For example, when program A and the mock object MB are integrated to each other, an integration test is realized by the configuration as illustrated in FIG. 6. On the other hand, when program A and program B are integrated to each other, an integration test is realized by the configuration as illustrated in FIG. 7. The integration test is realized by, for example, a flow as illustrated in FIG. 11.

Therefore, switching between the integration tests to be performed occurs according to the type of module that is integrated to program A. Therefore, switching between the test results to be output also occurs in conjunction therewith.

In the integration test, for example, a test for the same interface and parameters is performed. That is, in the integration test, the PC 10 performs each test to be performed in each unit test. Therefore, it is desirable for the PC 10 to convert the test cases that are used in each unit test using the conversion section 10F6 and combine the test cases to generate a test case for the integration test. Thus, in the integration test, the PC 10 can execute the test performed in the unit test without omission and without duplicate. As described above, for example, when there is the conversion table as illustrated in FIG. 8, the PC 10 can divert the test cases for the unit test to the integration test. Therefore, the PC 10 can execute the integration test even when the test case for the integration test is not prepared separately from the test case for the unit test in advance by the user.

In the integration test, when a test corresponding to the test case is executed by a lower-level module or the like, even when the lower-level module or the like may be notified of, for example, the API name, the argument, and the return value serving as an expected value, rather than the test name. The lower-level module or the like notified of the API name, argument, and return value determines whether or not the test is a test for the subject module from content of, for example, the notified API name, argument, and return value serving as the expected value. When the lower-level module or the like notified of the API name, argument, and return value determines that the test is a test for the subject module, the lower-level module or the like notified of the API name, argument, and return value sets a test module or the like based on the notified content. Thus, even when there is no conversion table as illustrated in FIG. 8 or the like, the PC 10 can perform the integration test by diverting the test cases for a unit test.

Further, in the integration test, all the tests may not be executed. For example, there are many cases in which a so-called branch is present in a module according to content of processing. Specifically, in C language, when there is an "if" sentence or a "case" sentence, the process branches according to a condition. In the test, it is desirable for test cases to be generated so that all branches are covered, that is, for the test cases to be prepared so that a so-called coverage rate becomes "100%". However, according to a specification or the like, conditions that are difficult to occur may be included. For example, so-called abnormal system conditions may occur solely with a relatively low probability, may be conditions that do not occur unless a long-time process is executed, or may have no significant influence even when the conditions occur. In the test case as described above, a necessity of covering all the conditions may be low in the integration test when the test is sufficiently performed in the unit test.

The coverage rate is not limited to the coverage of the branch, and may be, for example, a coverage of a sentence, a coverage of a condition, a coverage of a route, a coverage of an entrance/an exit, a coverage of a bit, or a combination thereof. That is, the coverage rate may be a numerical value that can be investigated through so-called coverage analysis or the like.

Some or all of the test cases as described above may be omitted. For example, when a process as a loop continues and the test is performed for a long time, the PC 10 may stop the test midway or omit some of the tests. As described above, the PC 10 can efficiently perform the tests by omitting tests with low necessity.

When the test is executed for a long time or the number of times of processing becomes a relatively great value, the PC 10 may perform a notification to stop the loop or the like and interrupt a part of the test. When the test enters an infinite loop or, for example, conditions with a low possibility of occurrence is tried to be created according to conditions, the test execution time or the number of times of processing may increase. In the case as described above, the PC 10 may make the test efficient, for example, by avoiding the infinite loop.

According to the test, there may be a test that is executed in a first unit test, but is not executed in a second unit test. The test as described above may be omitted not to be executed, for example, in the integration test in order to obtain conformity.

The PC 10 determines whether the module integrated to the first module is a test module or a second module using the determination section 10F4. For example, a determination procedure is a process such as step S203. For example, in the case of the configuration as illustrated in FIG. 6, that is, in a case where the test module is integrated and the integration test is performed, the PC 10 omits a test for the test module as in step S204. As described above, the PC 10 switches the integration test according to the type of the module integrated to the first module.

The test module is a substitute for the second module, and, in many cases, testing the test module does not lead to improvement in quality of the module, or the like. Therefore, the PC 10 omits the test for the test module when the test module is integrated, in order to prevent the test for the test module from being performed. Thus, the PC 10 can prevent useless testing from being executed, and the test can be made efficient, for example, by shortening a test execution time.

Other Embodiments

The information processing device may be a plurality of devices. That is, the embodiment may be realized by, for example, an information processing system including one or more information processing devices.

Further, the information processing device may perform the unit test and the integration test on three or more modules. That is, the integration test may be a test in which three or more modules are integrated.

The test method is not limited to a test that is performed to debug software such as a program. That is, the module that is a test target is not limited to a file of a source code described by a programming language such as C language. For example, the module may be a file of a source code described in Hardware Description Language (HDL) such as Verilog. That is, in the case of HDL or the like, the test driver may be a test bench or the like, and a so-called verification (assertion) may be included in the test.

The embodiment according to the present disclosure may be realized by a program for causing a computer such as an information processing device or an information processing system to execute each procedure related to the above-described test method. The program can be stored and distributed on a computer readable recording medium.

Although the preferred examples of the present disclosure have been described above, the present disclosure is not limited to the described embodiments, and various modifications or changes may be performed within the scope of the gist of the present disclosure described in the claims.

What is claimed is:

1. A test method for a first module that is performed by an information processing device, the test method comprising:
    performing a unit test on the first module, wherein the unit test is performed using an interface and parameters;
    integrating a second module or a test module that performs the same response as the second module to the first module;
    performing an integration test on a module group including at least the first module, wherein:
        the integration test is performed using the interface and the parameters; and
        a test case for performing the integration test is generated using a conversion table based on a test case for performing the unit test on respective modules on which the integration test is performed; and
    outputting any one of a result of an integration test for the first module and the second module and a result of an integration test for the first module based on determination data indicating which one of the second module and the test module is integrated to the first module.

2. The test method according to claim 1, wherein the outputting of the result of the test includes
    outputting the result of the integration test for the first module and the second module when the determination data indicates that the second module is integrated to the first module, and
    outputting the result of the integration test for the first module when the determination data indicates that the test module is integrated to the first module.

3. The test method according to claim 1, wherein in the integration test, the integration test for the first module and the second module is performed as the integration test when the determination data indicates that the second module is integrated to the first module, and the integration test for the first module is performed as the integration test when the determination data indicates that the test module is integrated to the first module.

4. The test method according to claim 1, wherein the first module and the second module are files described in a programming language or a hardware description language.

5. The test method according to claim 1, wherein the determination data is link information indicating a link destination of the first module.

6. The test method according to claim 1, wherein the determination data is flag information indicating a type of a module to which the first module is linked.

7. The test method according to claim 1, wherein when a determination is made that the test module has been integrated to the first module based on the determination data, the integration test for the second module is not performed in the integration test.

8. The test method according to claim 1, wherein the test module is a stub.

9. A non-transitory computer readable medium storing a program for causing a computer to execute a test method for a first module, the program causing the computer to execute:
- a test procedure for performing a unit test on the first module, wherein the unit test is performed using an interface and parameters;
- an integrating procedure of integrating a second module or a test module that performs the same response as the second module to the first module;
- an integration test procedure of performing an integration test on a module group including at least the first module, wherein:
  - the integration test is performed using the interface and the parameters; and
  - a test case for performing the integration test is generated using a conversion table based on a test case for performing the unit test on respective modules on which the integration test is performed; and
- a test result output procedure of outputting any one of a result of an integration test for the first module and the second module and a result of an integration test for the first module based on determination data indicating which one of the second module and the test module is integrated to the first module.

10. The non-transitory computer readable medium according to claim 9, wherein the test result output procedure includes
- outputting the result of the integration test for the first module and the second module when the determination data indicates that the second module is integrated to the first module, and
- outputting the result of the integration test for the first module when the determination data indicates that the test module is integrated to the first module.

11. The non-transitory computer readable medium according to claim 9, wherein the integration test procedure includes
- performing the integration test for the first module and the second module as the integration test when the determination data indicates that the second module is integrated to the first module, and
- performing the integration test for the first module as the integration test when the determination data indicates that the test module is integrated to the first module.

12. The non-transitory computer readable medium according to claim 9, wherein the first module and the second module are files described in a programming language or a hardware description language.

13. The non-transitory computer readable medium according to claim 9, wherein the determination data is link information indicating a link destination of the first module.

14. The non-transitory computer readable medium according to claim 9, wherein the determination data is flag information indicating a type of a module to which the first module is linked.

15. The non-transitory computer readable medium according to claim 9, wherein when a determination is made that the test module has been integrated to the first module based on the determination data, the integration test for the second module is not performed in the integration test procedure.

16. The non-transitory computer readable medium according to claim 9, wherein the test module is a stub.

* * * * *